United States Patent Office 3,413,300
Patented Nov. 26, 1968

3,413,300
BUTOXYBUTYLAMINE SALTS OF CHLORINATED HERBICIDAL ACIDS
Edwin J. Haertl, Midland, Mich., assignor to The Dow Chemical Company, Midland, Mich., a corporation of Delaware
No Drawing. Filed Jan. 19, 1966, Ser. No. 521,559
5 Claims. (Cl. 260—295)

ABSTRACT OF THE DISCLOSURE

The present disclosure is directed to the butoxybutylamine salts of herbicidal acids and in particular, to the butoxybutylamine salts of trichloroacetic acid, 2,2-dichloropropionic acid, 2,4-dichlorophenoxyacetic acid and 4-amino-3,5,6-trichloropicolinic acid. These salts are highly soluble in both water and oil and stable even when dissolved in herbicidally-active concentrations. The method of preparation as well as the use of the salts as herbicides is taught.

---

The present invention is concerned with herbicides and is particularly directed to an improved herbicidal salt.

Many herbicidal substances are, in their photo-type form, acids. In the acid form many of them are not readily dispersed in any liquid vehicle. To render them more readily dispersible, they are sometimes caused to react with an alkali metal alkaline substance whereby to form an alkali metal salt, such as a sodium salt. Alternatively, and in similar procedures, the ammonia or amine salt may be formed. For some uses, the acids are caused to react with alcoholic substances in order to produce esters. Although the formulation of herbicidal acids in readily exhibited forms has been studied for many years, at the present time one of the most common expedients is to formulate the acid in a water-insoluble form which is soluble in an oily solvent, to dissolve it in such oily solvent together with a wetting or dispersing agent, and in this form to dilute it further with oil to obtain a working oil solution, or to emulsify it in water to obtain an emulsion in water of the herbicide-containing oil phase, which is then applied. Such water emulsion can be diluted to any desired degree to attain aqueous concentrations adapted to equipment used in applying herbicides at desired rates over desired areas.

An essentially ideal formulation which is presented by the present invention, is a derivative of an acid herbicide which, essentially without such additives as surface active agents or co-solvents, can be dissolved either in water, when aqueous dispersion is desired; or in oil.

According to the present invention, a herbicidal acid is caused to react in routine manner with a butoxybutylamine of the formula

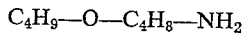

$C_4H_9—O—C_4H_8—NH_2$ to obtain a butoxybutylamine salt of a herbicidal acid, whereby the resulting salt is soluble in herbicidally active concentrations in hydrophilic and aqueous solvents and in lipophilic and oily solvents.

It is not recommended, and it would not routinely be practiced, that a simple mixture of such dissimilar solvents be employed; although the mixture could be used.

More particularly, the present invention is concerned with the butoxybutylamine salt of trichloroacetic acid, with the butoxybutylamine salt of 2,2-dichloropropionic acid, with the butoxybutylamine salt of 2,2,3-trichloropropionic acid, with the butoxybutylamine salt of 2,4-dichlorophenoxyacetic acid, with the butoxybutylamine salt of 2,4,5-trichlorophenoxyacetic acid, with the butoxybutylamine salt of 2-(2,4,5-trichlorophenoxy)propionic acid, and with the butoxybutylamine salt of 4-amino-3,5,6-trichloropicolinic acid. These acids, and the butoxybutylamine salts designated, are representative of herbicidal acids of a wide range which are known and used in the control of vegetation, of which, broadly, the butoxybutylamine salts constitute the present invention.

As the particular object of the present invention, one aspect is the causing of a reaction between a herbicidal acid and butoxybutylamine, whereby there is obtained a butoxybutylamine salt of the herbicidal acid of which a portion is thereafter stably dispersed, without adjuvant, in herbicidal concentration, in water; and a further portion is stably dispersed, without adjuvant, in herbicidal concentration, in oil.

The expression "oil" in the present specification and claims is used in its most ordinary sense, to designate any of a number of kinds of oil, typically but not exclusively a hydrocarbon oil derived from petroleum distillation, and kerosene is regarded as representative. Other solvent oils can also be used.

The solubility of a given butoxybutylamine salt of a herbicidal acid, in respectively, oil, and in water, will differ from the solubilities in the same solvents of the same salts of other acids; but in any event the products are soluble in either solvent, however embodied, to a degree sufficient to permit useful application as a herbicide.

Preparation of the butoxybutlamine salts of the herbicidal acids, to obtain the salts of the present invention, is readily carried out in procedures essentially the same as those used in preparation of other amine salts. The amine is a liquid, and some of the herbicidal acids are liquids, at ordinary temperatures. Thus the amine can be used as a liquid to confer mobility upon the mixture of amine and herbicidal acid. It may be convenient to employ a liquid reaction medium which should, preferably, be inert to the amine and acid employed as reactants. It may be, but is not necessarily, a liquid that is solvent for one or both of the components that are to react. Representative reaction media include the light hydrocarbon oils, benzene, toluene, xylene, acetone, lower alkanols such as methanol and ethanol; methyl ethyl ketone and other lower alkyl ketones; also dimethyl formamide, propylene glycol dimethyl ether, and the like. Water can be used, but its use is not preferred in the instance of products that are unstable in water solution, or in the instance of products from which water is difficult to remove. However, when a water solution is to be used, the product can be prepared directly as a water solution and the resulting water solution used directly.

The herbicidal acid and amine reactants are to be supplied to the reaction in equimolecular amounts. The butoxybutylamine has a molecular weight of approximately 145. Thus, for each 145 weight units, such as grams or pounds, of the amine, there will be supplied one equivalent molecular weight unit of the acid. Thus, trichloroacetic acid has a molecular weight of approximately 163.5. Hence, about 163.5 pounds of trichloroacetic acid would be reacted with about 145 pounds butoxybutylamine to obtain approximately 308.5 pounds of the resulting salt, as product of the present invention. It is thus apparent that, according to the present example, the essentially pure product would comprise about 53 weight percent of the herbicidal acid, and the salt is readily soluble at herbicidal concentrations in either oil, such as a light petroleum oil which may be kerosene, or in water. When for any reason it is desired to obtain a product having a pH of a predetermined value, it can be adjusted by adding more, or less, of the amine.

The stoichiometry above indicated should be observed when it is desired to obtain a product of the present invention that is soluble in either oil or water.

It is purely a matter of convenience which of the reactants is first brought to a reaction site, the other reactants subsequently added thereto. Typically, the reactants will be combined together slowly, portion-wise, and with stirring, and optionally with provision for heating or, more usually, cooling, depending upon climatic exposure; identity of the acid, and other matters.

Upon completion of the reaction, when employing stoichiometric amounts of the reactants, the product is pure to the extent the starting materials were pure. The degree of purity necessary will vary, and will depend upon the herbicide and its intended use; but this will in any event lie within the skill of the art. When purity of a high degree is desired, it will be preferred to purify the starting materials. The highly versatile solubility of the products of the present invention usually makes it more difficult to purify the product than the starting materials.

From the foregoing statement, skilled chemists will be enabled to practice the present invention. The examples following set forth the best method known to the inventor.

Example 1.—Butoxybutylamine salt of trichloroacetic acid

In a 500 milliliter round bottom flask equipped with a stirrer and funnel for introduction of reactants is placed 100 milliliters petroleum ether. Into this is dispersed 14.5 grams butoxybutylamine. Into the resulting mixture is added, slowly, portionwise, and with stirring, 16.4 grams trichloroacetic acid. The resulting mixture is stirred for a few minutes to assure completion of the reaction, and thereafter removed from the flask and placed in an evaporating dish in a vacuum oven. Solvent is removed by holding the mixture under subatmospheric pressure (about 100 millimeters mercury, absolute) at about 30° C. for about six hours.

As a result of these procedures there is obtained a butoxybutylamine salt of trichloroacetic acid as a hygroscopic liquid apparently carrying suspended solids. It is readily soluble in water or in light petroleum oils. The water solution is herbicidal and, when employing an oil that is not herbicidal alone, the oil solution is herbicidal also. The herbicidal action is similar in species selectivity, and apparent action, to that manifest by the alkali metal salts, such as the sodium salt, of trichloroacetic acid.

Example 2.—Butoxybutylamine salt of 2,2-dichloropropionic acid

The present reaction is carried out on a pilot plant scale. One half pound mole of each of 2,2-dichloropropionic acid and butoxybutylamine, both liquids, are weighed into separate vessels above the reactor vessel and with provision for gravity drainage into the glass reactor. The reactor is equipped with refrigerated heat-transfer means, thermometer, and stirrer.

The reactants are drained into the reactor vessel slowly, continuously, and with stirring and chilling. The reactants are added at the rate of about 0.25 pound of each reactant per minute, the rate being determined by the heat-exchange capacity of the cooling system. More than four but fewer than five hours are required to complete the combining of the reactants. More rapid reacting of the starting materials would be practical with heat-transfer means of higher capacity.

Upon the completion of the addition of 71.5 pounds of the acid and 72.5 pounds of butoxybutylamine, stirring is continued until a decline in temperature indicates essential completion of the reaction.

No byproduct is formed, and there are produced 144 pounds—one half pound mole—of the butoxybutylamine salt of 2,2-dichloropropionic acid as a liquid.

The substance is dispersible without surfactant in mineral oil and in water, in concentrations sufficient that either is thereby rendered actively herbicidal.

Example 3.—Butoxybutylamine salt of 2,4-dichlorophenoxy acetic acid

In manner similar to the foregoing, 221 pounds 2,4-dichlorophenoxy acetic acid, naturally a white, crystalline solid, is dispersed slowly, and with continuous stirring, into approximately 145 pounds butoxybutylamine, a liquid. The reaction is strongly exothermic and the rate of combining of the reactants is controlled so as to use fully but not exceed the heat-exchange capacity of the equipment. Temperature is maintained below 100° C. although that temperature is not known to be critical. During preparation the mixture becomes a solid which is irregularly broken and displaced as pieces by the stirring impeller.

Example 4.—Butoxybutylamine salt of 2,4,5-trichlorophenoxyacetic acid

In a 2 liter round bottomed flask having appropriate provision for introduction of reactants, stirring, and other necessary procedures, is placed 500 milliliters acetone. To the acetone are added 255.5 grams (1 gram mole) 2,4,5-trichlorophenoxyacetic acid. The resulting mixture is stirred to disperse the acid uniformly in the acetone, and thereafter, to the resulting mixture, are added approximately 145 grams (1 gram mole) butoxybutylamine. The butylamine is added slowly, portionwise, with continuous stirring, and maintaining the resulting reaction mixture and its flask over an ice bath. Temperature of the resulting mixture is at all times kept below approximately 30° C., although the temperature is not known to be critical.

Upon completion of the combining of the reactants, stirring is continued for a short period of time to insure the completion of the reaction, and thereafter the resulting mixture is heated in an evaporating dish to vaporize and remove acetone, and obtain the butoxybutylamine salt of 2,4,5-trichlorophenoxyacetic acid as a crystalline solid.

Example 5.—Butoxybutylamine salt of 4-amino-3,5,6-trichloropicolinic acid

In a large glass flask in a semi-pilot plant apparatus are placed 24.15 pounds (0.1 pound mole) 4-amino-3,5,6-trichloropicolinic acid. The acid is a pale tan solid melting at 209.5–210° C. To this solid are added 10 liters of a light petroleum fraction as liquid reaction medium. The resulting mixture is stirred to obtain a uniform dispersion of the acid in the liquid. To the resulting mixture is added 14.5 pounds (0.1 pound mole) butoxybutylamine. The butylamine is added slowly, with continuous stirring and with cooling of the resulting reaction mixture. Upon the completion of the combining of the reactants, stirring is continued for a short period of time to assure the completion of the reaction, and thereafter the petroleum fraction is volatilized and removed as a vapor. As a result of these procedures there is obtained slightly more than 38.5 pounds, approximately 0.1 pound mole, of the butoxybutylamine salt of 4-amino-3,5,6-trichloropicolinic acid. The salt is soluble in either oil or water without adjuvant to the extent that either solution is herbicidally active. The salt is a tan, crystalline solid.

I claim:
1. Butoxybutylamine salt of a herbicidal acid selected from the group consisting of trichloroactic acid, 2,2-dichloropropionic acid, 2,4-dichlorophenoxyacetic acid and 4-amino-3,5,6-trichloropicolinic acid, said salt being soluble in both water and oil.
2. Composition of claim 1 wherein the acid is 2,2-dichloropropionic acid.
3. Composition of claim 1 wherein the acid is 2,4-dichlorophenoxy acetic acid.
4. Composition of claim 1 wherein the acid is 4-amino-3,5,6-trichloropicolinic acid.

5. Composition of claim 1 wherein the acid is trichloroacetic acid.

References Cited

UNITED STATES PATENTS

| | | | |
|---|---|---|---|
| 2,689,262 | 9/1954 | Scoles | 71—113 |
| 3,081,162 | 3/1963 | Tischler | 71—113 |
| 3,249,419 | 5/1966 | Martin | 71—94 |
| 3,285,925 | 11/1966 | Johnston et al. | 260—294.9 |
| 2,697,721 | 12/1954 | Kelly | 71—113 |

HENRY R. JILES, *Primary Examiner.*

A. L. ROTMAN, *Assistant Examiner.*